United States Patent [19]

Urushiyama et al.

[11] 4,078,830

[45] Mar. 14, 1978

[54] WHEEL SUSPENSION APPARATUS

[75] Inventors: Goro Urushiyama; Seiji Kasai, both of Oi; Toshihiko Aoyama, Wako, all of Japan

[73] Assignee: Honda Giken Kogyo Kabushiki Kaisha, Tokyo, Japan

[21] Appl. No.: 703,108

[22] Filed: Jul. 6, 1976

[30] Foreign Application Priority Data

Jul. 11, 1975    Japan .................................. 50-84422

[51] Int. Cl.² .............................................. B60G 1/00
[52] U.S. Cl. ................................................. 280/688
[58] Field of Search ........................................ 280/688

[56] References Cited

U.S. PATENT DOCUMENTS

| 2,812,953 | 11/1957 | Ronning | 280/688 |
| 3,520,554 | 7/1970 | Ravenel | 280/688 |

Primary Examiner—Richard A. Bertsch
Attorney, Agent, or Firm—Haseltine, Lake & Waters

[57] ABSTRACT

A wheel suspension apparatus in which respective knuckles of a pair of left and right wheels are supported on a frame of the vehicle body through respective radius rods extending forwardly and respective shock absorbers extending upwardly, the knuckles being pivotably connected to respective swingable lower arms extending inwardly and interconnected at their inner ends to form a transversely extending integral rigid shaft which is supported on the vehicle body frame through a Panhard rod.

2 Claims, 8 Drawing Figures

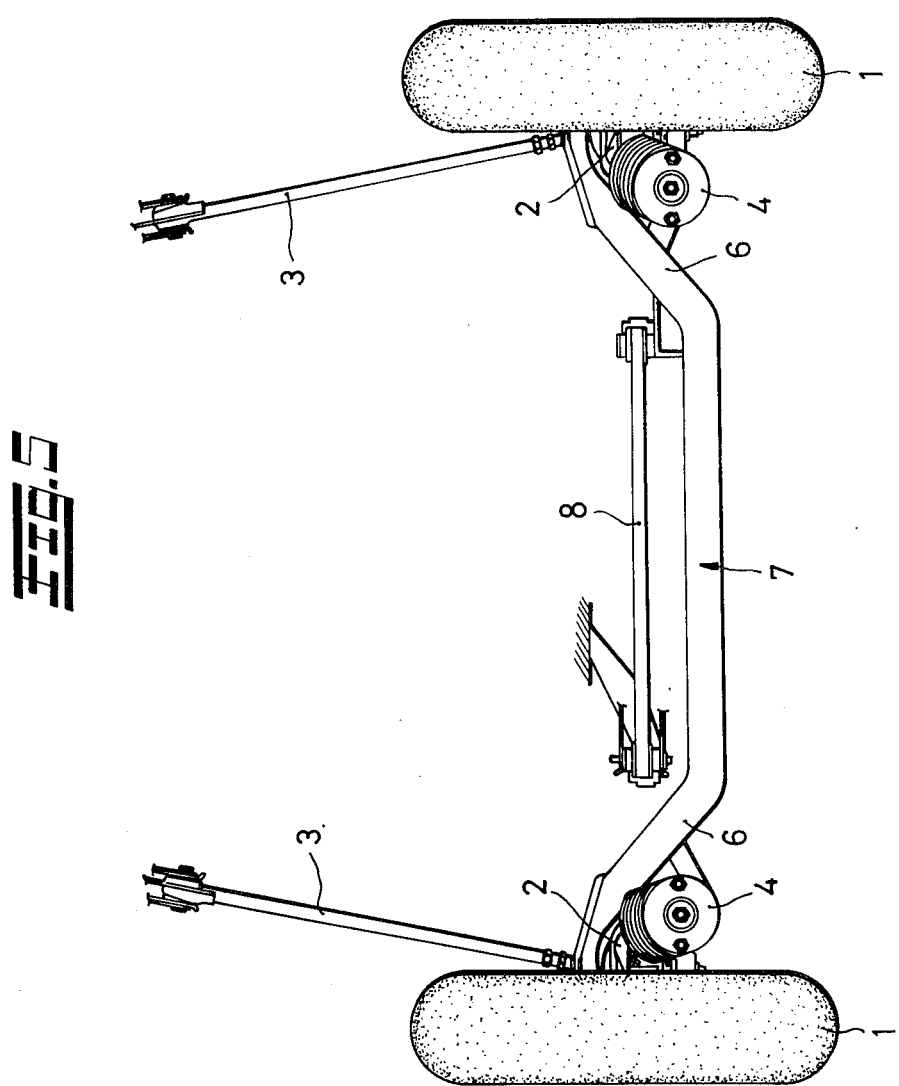

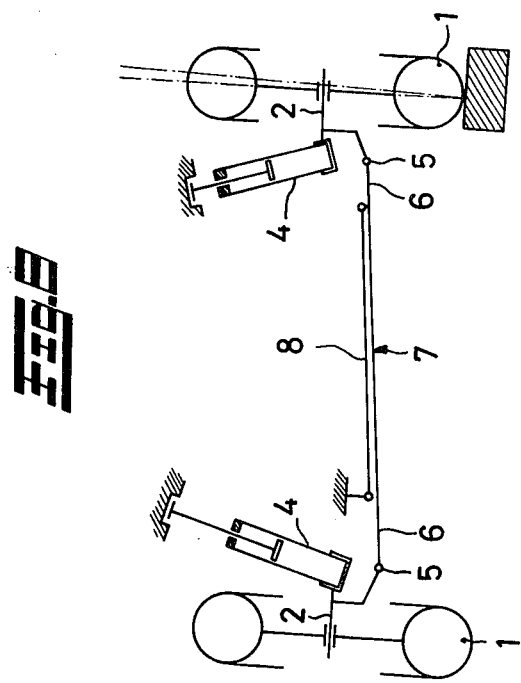
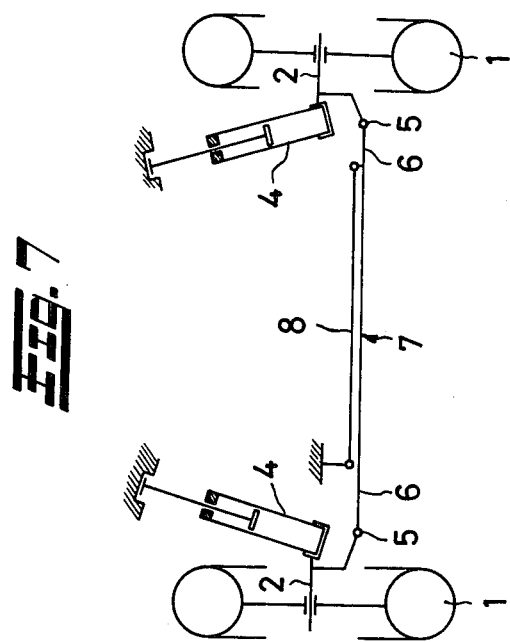

WHEEL SUSPENSION APPARATUS

FIELD OF THE INVENTION

This invention relates to a suspension apparatus of strut type used mainly for the rear wheels of a motorcar.

BRIEF DESCRIPTION OF THE DRAWING

FIG. 5 is a top plan view of one embodiment according to the invention.

PRIOR ART

Figure 1:
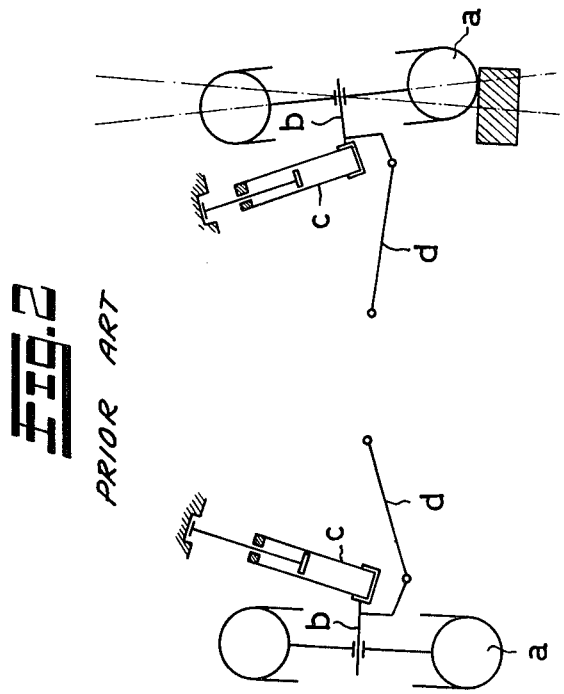
FIGS. 1-4 are diagrammatic illustrations of rear wheel suspensions of conventional construction.
Figure 2:
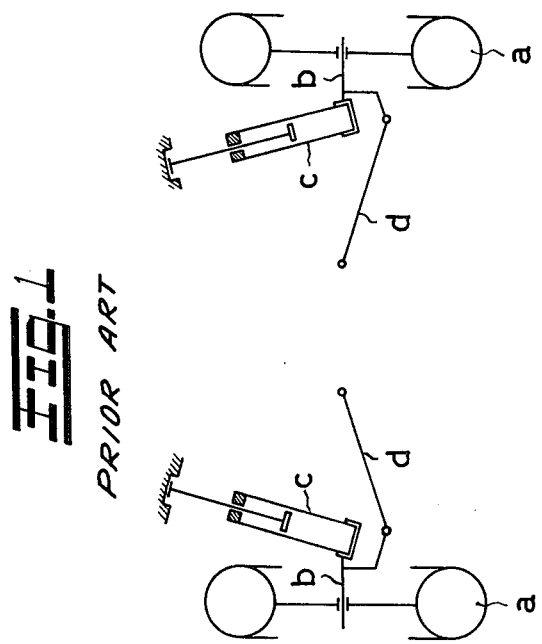

In apparatus of this type, a known arrangement is shown in FIG. 1 wherein respective knuckles $b$, of left and right wheels $a$ are supported on a vehicle body frame through respective radius rods extending forwardly (not illustrated) and respective shock absorbers $c$, extending upwardly and also by respective swingable lower arms $d$ extending inwardly for support on the lower surface of the vehicle body frame. This arrangement has various advantages, but, because each lower arm $d$ cannot be given a sufficiently large arm length, it undergoes a circular arc movement of comparatively small radius of curvature on upward and downward movements of the wheel $a$ and, in accordance therewith, there is produced a change in tread and a change in camber. This is as shown, for instance, in FIG. 2.

Figure 4:
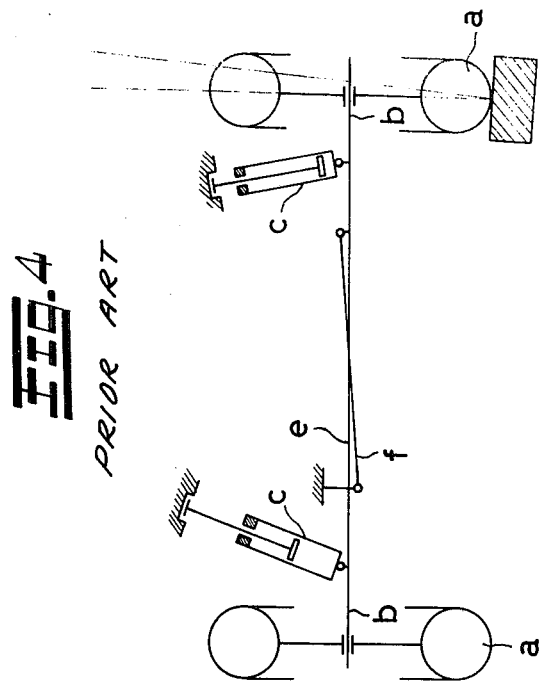
Figure 3:
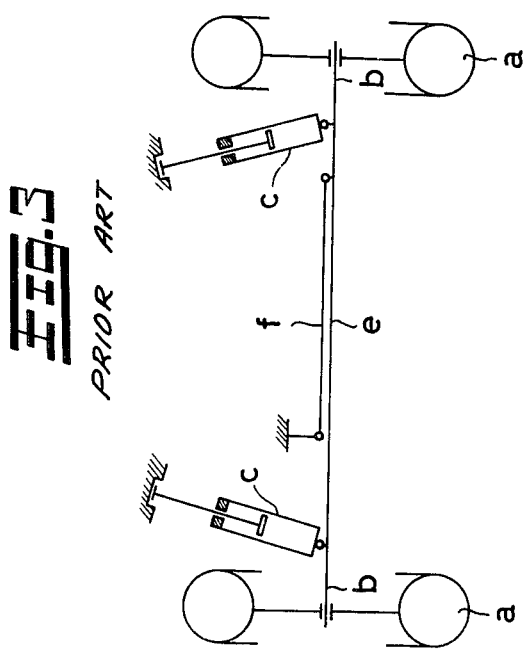
Figure 6:
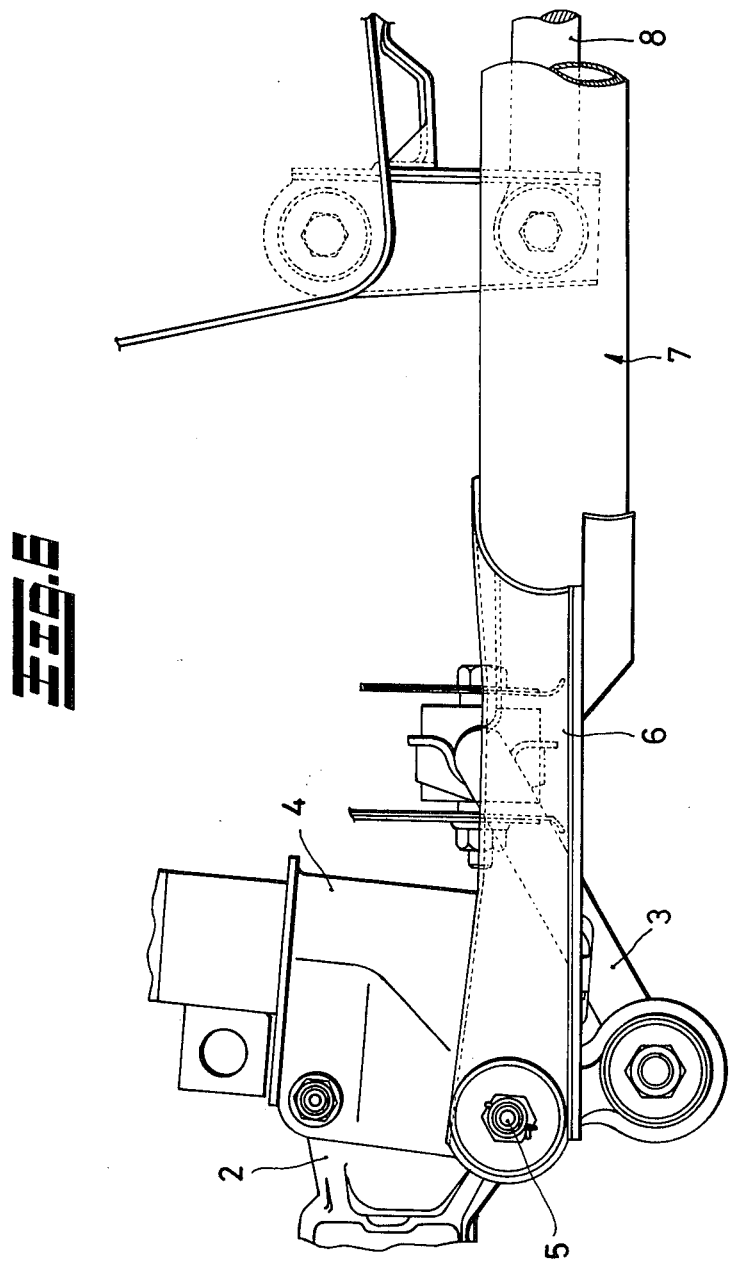
FIG. 6 is a front view of a major portion of the construction in FIG. 5 and FIGS. 7 and 8 are diagrammatic illustrations showing the operation of the embodiment of FIG. 6.

In order to eliminate these disadvantages, there has been proposed the arrangement as shown in FIG. 3, wherein, the left and right swingable lower arms are omitted and the two knuckles $b$ are interconnected by a rigid shaft $e$ so as not to be swingable in relation thereto and the shaft $e$ is supported on the vehicle body frame through a Panhard rod $f$. Even in this arrangement, however, it cannot be avoided, as shown in FIG. 4, for instance, that there is produced a large change in camber on upward and downward movements of the wheel $a$.

SUMMARY OF THE INVENTION

An object of this invention is to provide a wheel suspension apparatus which is free from the disadvantages noted above.

According to the invention, in an arrangement of the type in which respective knuckles of a pair of left and right wheels are supported on a vehicle body frame through respective radius rods extending forwardly and respective damper struts extending upwardly and are provided with respective swingable lower arms extending inwardly, the construction is characterized in that the left and right lower arms are interconnected at their inner ends to form a transversely extending integral rigid shaft which is supported on the vehicle body frame through a Panhard rod.

DETAILED DESCRIPTION

One embodiment of this invention will now be described with reference to FIGS. 5-8 of the drawings.

Referring to these figures of the drawings numeral 1 denotes a pair of left and right rear wheels and numeral 2 denotes respective knuckles provided at their inner surfaces. The knuckles 2 are supported on a frame of the vehicle body through respective radius rods 3 extending forwardly and respective damper struts or shock absorbers 4 extending upwardly. The knuckles are provided with respective lower arms 6 extending inwardly and connected pivotally to the knuckles at their ends through respective pins 5. In this embodiment, however, the lower arms 6 are not connected at their inner ends directly to the frame of the vehicle body as in the conventional construction, but they are interconnected at their inner ends integrally so as to form a transversely laterally extending integral rigid shaft 7. The shaft 7 is supported on the vehicle body frame on the upper side thereof through a Panhard rod 8 which is substantially the same as the Panhard rod $f$ in the conventional construction as described in connection with FIGS. 3 and 4. Thus, the rigid shaft 7 is constructed to have the pivot points 5 at both its ends so that if the shaft 7 is assumed to be the respective lower arms 6, each arm 6 comes to have an arm length extending nearly the entire width of the vehicle body frame and the foregoing disadvantages attributable to the conventional construction wherein the arm length of insufficient length can be overcome. This is shown, for instance, in FIGS. 7 and 8 wherein the change in track and camber is minimized due to upward and downward movement of the wheels.

Thus, according to the invention, the lower arms on both sides are interconnected at ther inner ends so as to form a single long transversly extending rigid shaft, which serves as a comparatively long arm for the wheel on each side thereby avoiding the disadvantage in the conventional construction wherein the arm is comparatively short. In other respects, the other advantages of the conventional strut construction can be retained and there can be obtained an excellent suspension apparatus.

What is claimed is:

1. In a wheel suspension apparatus for the support of left and right wheels from a frame of a vehicle body wherein the wheels include respective knuckles, radius rods extending forwardly and connecting the knuckles to the frame, and shock absorbers extending upwardly and also connecting the knuckles to the frame, an improvement comprising respective swingable lower arms having outer end portions, respective pins extending substantially horizontally in the longitudinal direction of the vehicle body pivotably connecting respective arms to said knuckles, said arms extending inwardly and being interconnected to form a transversely extending integral rigid shaft, and a Panhard rod connecting said rigid shaft to said frame.

2. An improvement as claimed in claim 1 wherein said lower arms are integrally formed as a single shaft.

* * * * *